(12) United States Patent  (10) Patent No.: US 8,156,292 B2
Bondurant et al.  (45) Date of Patent: Apr. 10, 2012

(54) METHODS FOR IMPLEMENTATION OF DATA FORMATS ON A REMOVABLE DISK DRIVE STORAGE SYSTEM

(75) Inventors: Matthew D. Bondurant, Superior, CO (US); S. Christopher Alaimo, Boulder, CO (US); Chris Mayne, Boulder, CO (US)

(73) Assignee: Tandberg Data Holdings S.A.R.L., Luxembourg (LU)

( * ) Notice: Subject to any disclaimer, the term of this patent is extended or adjusted under 35 U.S.C. 154(b) by 0 days.

(21) Appl. No.: 12/984,550

(22) Filed: Jan. 4, 2011

(65) Prior Publication Data

US 2011/0107039 A1 May 5, 2011

Related U.S. Application Data

(62) Division of application No. 12/024,659, filed on Feb. 1, 2008.

(60) Provisional application No. 60/959,056, filed on Jul. 10, 2007.

(51) Int. Cl.
G06F 12/00 (2006.01)
(52) U.S. Cl. .......................... 711/156; 711/154; 711/163
(58) Field of Classification Search .................. 711/156, 711/163, 154
See application file for complete search history.

(56) References Cited

U.S. PATENT DOCUMENTS

| 2005/0231846 A1 | 10/2005 | Winarski et al. |
| 2006/0010285 A1 | 1/2006 | Georgis |
| 2007/0219948 A1 | 9/2007 | Bugovics |
| 2008/0010324 A1* | 1/2008 | Stebner et al. ............... 707/204 |
| 2009/0019245 A1 | 1/2009 | Bondurant et al. |

OTHER PUBLICATIONS

U.S. Appl. No. 12/024,659, filed Feb. 1, 2008, Office Action mailed Oct. 4, 2010, 22 pages.

* cited by examiner

*Primary Examiner* — Yong Choe
(74) *Attorney, Agent, or Firm* — Kilpatrick Townsend & Stockton LLP

(57) ABSTRACT

An archiving system including one or more removable disk drives embedded in removable disk cartridges, referred to simply as removable disk drives. The removable disk drives allow for expandability and replacement such that the archiving system need not be duplicated to add new or more storage capacity. In embodiments, the removable disk drives store metadata that contain information about the data stored on the removable disk drive. The metadata allows the system to retrieve the correct data from the random access memory and establishes controls on the data stored on the removable disk drive. In embodiments, the metadata is stored in two locations, such that, if the metadata in one location is corrupted, the second copy of the metadata may be retrieved.

21 Claims, 8 Drawing Sheets

METHODS FOR IMPLEMENTATION OF DATA FORMATS ON A REMOVABLE DISK DRIVE STORAGE SYSTEM

CROSS-REFERENCES TO RELATED APPLICATIONS

This application is a divisional of U.S. patent application Ser. No. 12/024,659 filed Feb. 1, 2008, which is a continuation and claims the benefit of U.S. Patent Application No. 60/959,056, entitled "METHODS FOR IMPLEMENTATION OF DATA FORMATS ON A REMOVABLE DISK DRIVE STORAGE SYSTEM", filed on Jul. 10, 2007, the entire disclosures of which are herein incorporated by reference for all purposes.

BACKGROUND

Embodiments of the disclosure generally relate to storage systems and, more specifically, but not by way of limitation, to archiving storage systems.

An archiving storage system is used by one or more applications or application servers to store data for longer periods of time, for example, one year. Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage.

Generally, organizations store data over a period of time in several sessions. As data is stored, the data previously written may become obsolete. During a subsequent retrieval, the new data is retrieved rather than the older data. To retrieve the new data, storage systems generally store data sequentially and look for the last write location to retrieve the data. However, sequential storage prohibits the use of better, more efficient media and prohibits the use of other types of storage methods.

It is in view of these and other considerations not mentioned herein that the embodiments of the present disclosure were envisioned.

SUMMARY

Embodiments of the present disclosure provide a unique and novel archiving system. Embodiments include an archiving system having removable hard disk drives embedded in removable disk cartridges and are referred to simply as removable disk drives. The removable disk drives allow for expandability and replacement such that the archiving system need not be duplicated to add new or more storage capacity. Further, the removable disk drives provide advantages in speed and data access because, in embodiments, the data is stored and retrieved by random access rather than sequential access. In embodiments, the removable disk drives store metadata that contain information about the data stored on the removable disk drive. The metadata allows the system to retrieve the correct data from the random access memory and establishes controls on the data stored on the removable disk drive. In embodiments, the metadata is stored in two locations, such that, if the metadata in one location is corrupted, the second copy of the metadata may be retrieved.

BRIEF DESCRIPTION OF THE DRAWINGS

The embodiments of the present disclosure are described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Figure 1:
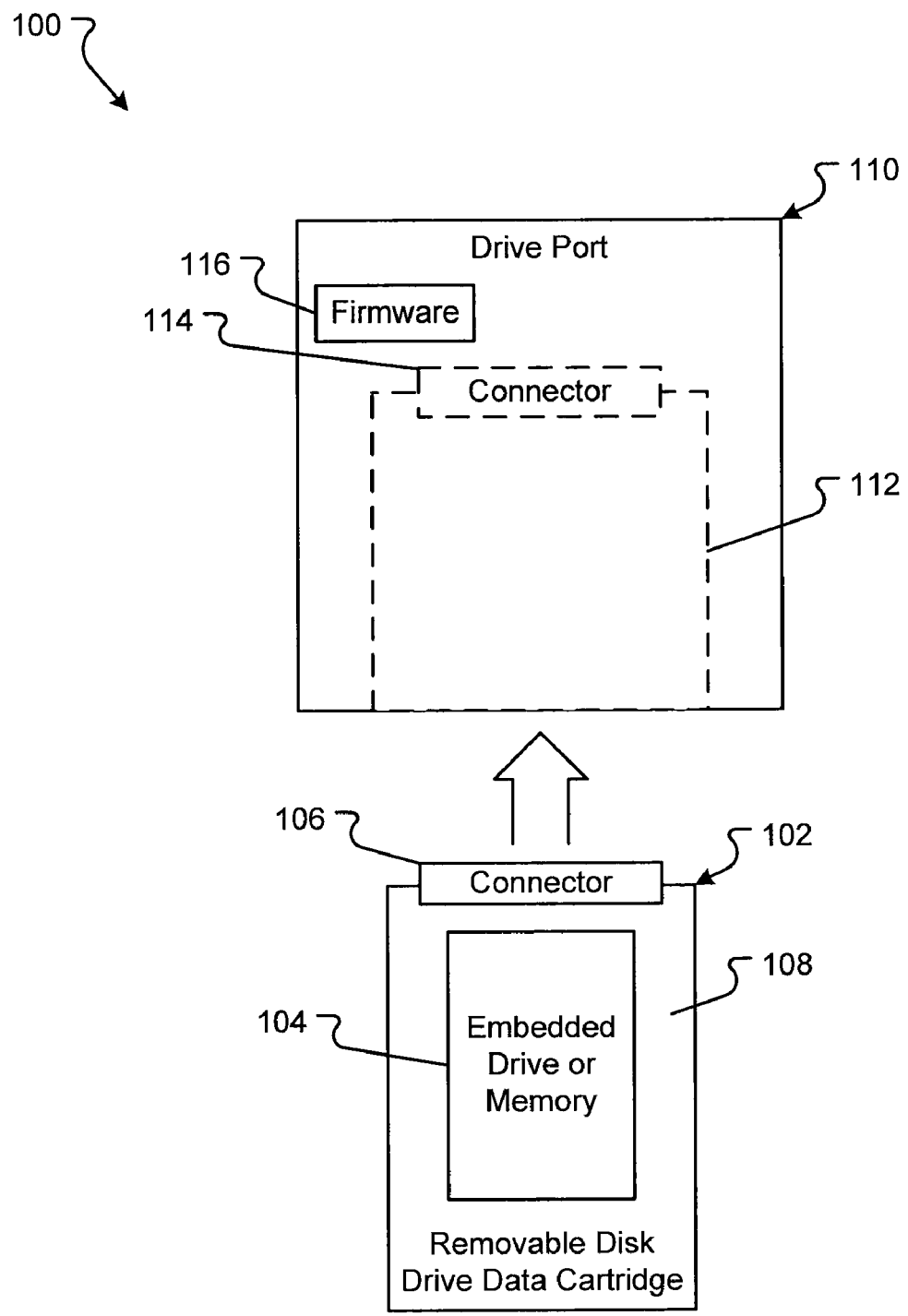
FIG. 1 is a block diagram of an embodiment of a removable cartridge storage system.

An embodiment of a removable disk system 100 to provide long-term archival data storage is shown in FIG. 1. A removable disk drive 102 provides storage capability for the removable disk system 100. In embodiments, the removable disk drive 102 includes a data cartridge case 108 and an embedded memory 104, which may be an embedded hard disk drive (HDD), solid state disk (SSD), solid state drive, or flash memory. The HDD or flash memory 104 provides a random access memory for storage of archived data.

The embedded memory 104 is in communication with and/or electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. In other embodiments, the embedded memory 104 and the connector 106 are a physically integrated component and the connector 106 protrudes from the data cartridge case 108. The data cartridge case 108, in embodiments, provides a solid container for the embedded memory 104 that also functions as an easily swappable case when interchanging removable disk drives 102 in the removable disk system 100.

The embedded memory 104, in embodiments, is not physically destroyed easily and is reusable if the data in the memory is removed, erased, altered, or changed. For example, the removable disk drive 102 is a hard drive that includes a magnetic media. If the data on the magnetic media is to be physically destroyed, the magnetic media would need to be removed and destroyed in an industrial shredder or other device that physically destroys the media. However, the data on the hard drive may be altered allowing the hard drive memory to be reused without allowing the data to be retrieved. Thus, data may be stored in random locations (rather than sequential locations) that are documented, such that, the removable disk system 100 retrieves the data from the correct locations.

In embodiments, the removable disk system 100 contains a drive port 110 that includes one or more data cartridge ports 112, each with a data cartridge connector 114 to receive the removable disk drive 102. The data cartridge connector 114 mates with the electrical connector 106 of the removable disk drive 102 to provide an electrical connection to the removable disk drive 102 and/or to communicate with the embedded memory 104 in the removable disk drive 102. As with the electrical connector 106, the data cartridge connector 114 may be a SATA connector or another type of connector. Regardless, the data cartridge connector 114 and the electrical connector 106 can be physically and/or electrically connected.

The data cartridge port 112 allows the data cartridge case 108 of the removable disk drive 102 to be easily inserted and removed as necessary. In embodiments, the drive port 110 includes two or more data cartridge ports 112 to allow for the use, control and communication with two or more removable disk drives 102. Each drive port 110, in embodiments, is separately addressable to allow for customized control over each removable disk drive 102 connected to each data cartridge port 112. Thus, as removable disk drives 102 are replaced, the same controls can be applied to the newly inserted removable disk drives 102 because the drive port 110 is addressed instead of the removable disk drives 102.

The embedded memory 104 may be read and used by the firmware 116 of the drive port 110. The firmware 116 may be hardware and/or software resident in the drive port 110 for controlling the removable disk drive 102. In embodiments, the firmware 116 contains the necessary software and/or hardware to power-up the removable disk drive 102, spin-up the disk platters in the embedded memory 104, read and write to the embedded memory 104, read, write and process metadata, etc. For example, the firmware 116 could read the embedded memory 104 to identify the removable disk drive 102 and gather information related to its contents.

In embodiments, the removable disk system 100 operates to receive one or more removable disk drives 102 in the one or more drive ports 110. The electrical connector 106 physically connects or couples with the data cartridge connector 114 to form an electrical connection that allows the drive port 110 to communicate with the embedded memory 104. The firmware 116 powers-up the embedded memory 104 and begins any initialization processes (e.g., security processes, identification processes, reading and/or writing, etc.). The drive port 110, which, in embodiments, is in communication with a network, receives archival data from one or more servers, applications, or other devices or systems on the network. The firmware 116 writes the archival data to the embedded memory 104 of the removable disk drive 102 to archive the data.

Figure 2:
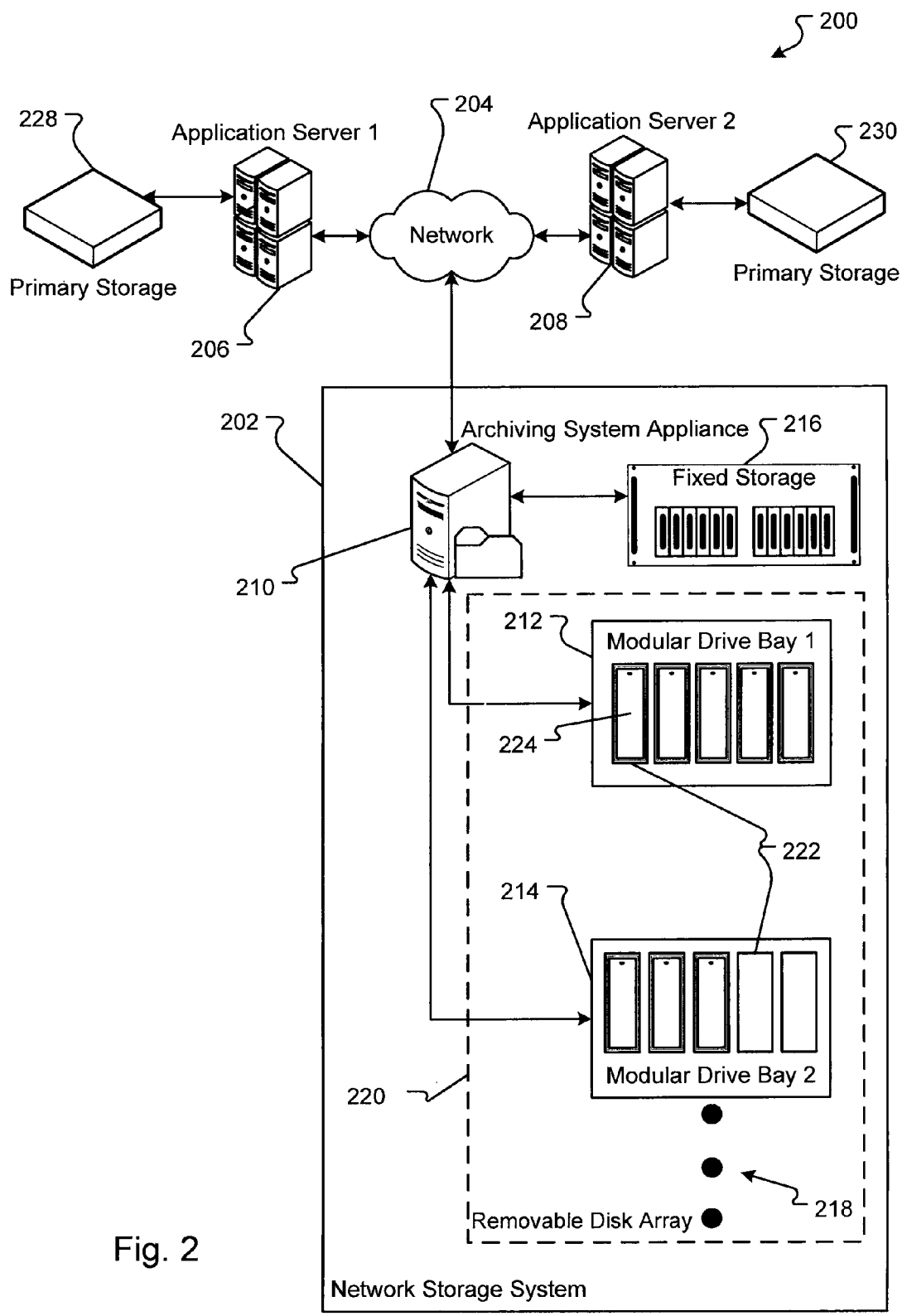
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the exemplary embodiments set forth herein.

The network storage system 202 comprises one or more components that may be encompassed in a single physical structure or be comprised of discrete components. In embodiments, the network storage system 202 includes an archiving system appliance 210 and one or more removable disk drives 224 connected or in communication with a drive port 222. In alternative embodiments, a modular drive bay 212 and/or 214 includes two or more drive ports 222 that can each connect with a removable disk drive 224. Thus, the modular drive bays 212 and 214 provide added storage capacity because more than one removable disk drive 224 can be inserted and accessed using the same archiving system appliance 210. Further, each drive port 222 in the modular drive bays 212 and 214 are, in embodiments, separately addressable allowing the archiving system appliance 210 to configure the removable disk drives 224 in the modular drive bays 212 and 214 into groups of one or more removable disk drives 224. Two or more modular drive bays 212 and 214, in embodiments, are included in the network storage system 202, as evidenced by the ellipses 218. Thus, as more data storage capacity is required, more modular drive bays 212 or 214 may be added to the network storage system 202.

The exemplary hardware architecture in FIG. 2 provides near limitless capacity as more removable disk drives 224 can be added to existing modular drive bays 212 or 214 until the modular drive bays 212 and 214 hold all possible removable disk drives 224. Then, more modular drive bays 212 and 214 are added to the network storage system 202. Further, removable disk drives 224 may be replaced as the removable disk drives 224 near their storage capacity. The removed disk drives 224, in embodiments, are physically stored if and until the data on the removable disk drives 224 needs to be retrieved. If the data on the removable disk drive 224 needs to be retrieved, the removable disk drive 224 may be inserted into one of the drive ports 222 of the modular drive bay 212 or 214, and the information retrieved from the connected removable disk drive 224.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

In embodiments, the two or more modular drive bays 212 and/or 214, having each one or more inserted removable disk drives 224, form a removable disk array (RDA) 232. The archiving system appliance 210 can configure the RDA 232 into one or more independent file systems. Each application server 206 or 208 requiring archiving of data may be provided a view of the RDA 232 as one or more independent file systems. In embodiments, the archiving system appliance 210 logically partitions the RDA 232 and logically associates one or more drive ports 222 with each application layer partition. Thus, the one or more removable disk drives 224 comprising the application layer partition appear as an independent file system.

In further embodiments, the archiving system appliance 210 provides an interface for application server 1 206 and application server 2 208 that allows the application servers 206 and 208 to communicate archival data to the archiving system appliance 210. The archiving system appliance 210, in embodiments, determines where and how to store the data to one or more removable disk drives 224. For example, the application server 1 206 stores archival data in a first application layer drive, such as, the first three removable disk drives. The application layer partitions are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture. In embodiments, the archival data is also referred to as an information element and may include, but is not limited to, a file, a memory sector, a data structure, a table, or other type or format of data.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides an active archive for storing certain data for a short period of time where the data may be more easily accessed. In embodiments, the archiving system appliance 210 copies archival data to both the fixed storage 216 and the removable disk drive 224. If the data is needed in the short term, the archiving system appliance 210 retrieves the data from the fixed storage 216.

The archiving system appliance 210 can also configure the active archive in the fixed storage 216 into one or more independent file systems, as with the RDA 232. As explained above, each application server may be provided a view of one of two or more independent file systems. Each independent file system may comprise an application layer partition in the RDA 232 and a related application layer partition in the fixed storage 216. In embodiments, the archiving system appliance 210 partitions the fixed storage 216 and associates each application layer partition in the fixed storage 216 with an associated application layer partition in the RDA 232.

As explained above, the archiving system appliance 210, in embodiments, determines where and how to store the data to one or more removable disk drives 224. For example, the application server 1 206 stores archival data in a first application layer drive, which may include storing the archival data in the application layer partition in the fixed storage 216 for easier access to the archival data. Again, the application layer drives are, in embodiments, presented to the application servers 206 and 208 where write and read permissions for any one application layer drive is specific to one of the application servers. As such, the network storage system 202 provides a multiple and independent file system to each application server 206 and 208 using the same hardware architecture.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the related application layer partitions in both the fixed storage 216 and the RDA 232, which may comprise one or more of the removable disk drives 224 in one or more of the drive ports 222. The archival data is written to the removable disk drive 224 for long-term storage and is written to the fixed storage 216 for short-term, easy-access storage. In further embodiments, application server 2 208 writes primary data to a primary storage 230 and also sends archival data to the network storage system 202. In some embodiments, the archival data from application server 2 208 is stored to a different removable disk drive 224 and a different portion of the fixed storage 216 because the archival data from application server 2 208 relates to a different application and, thus, a different application layer partition.

Figure 3:
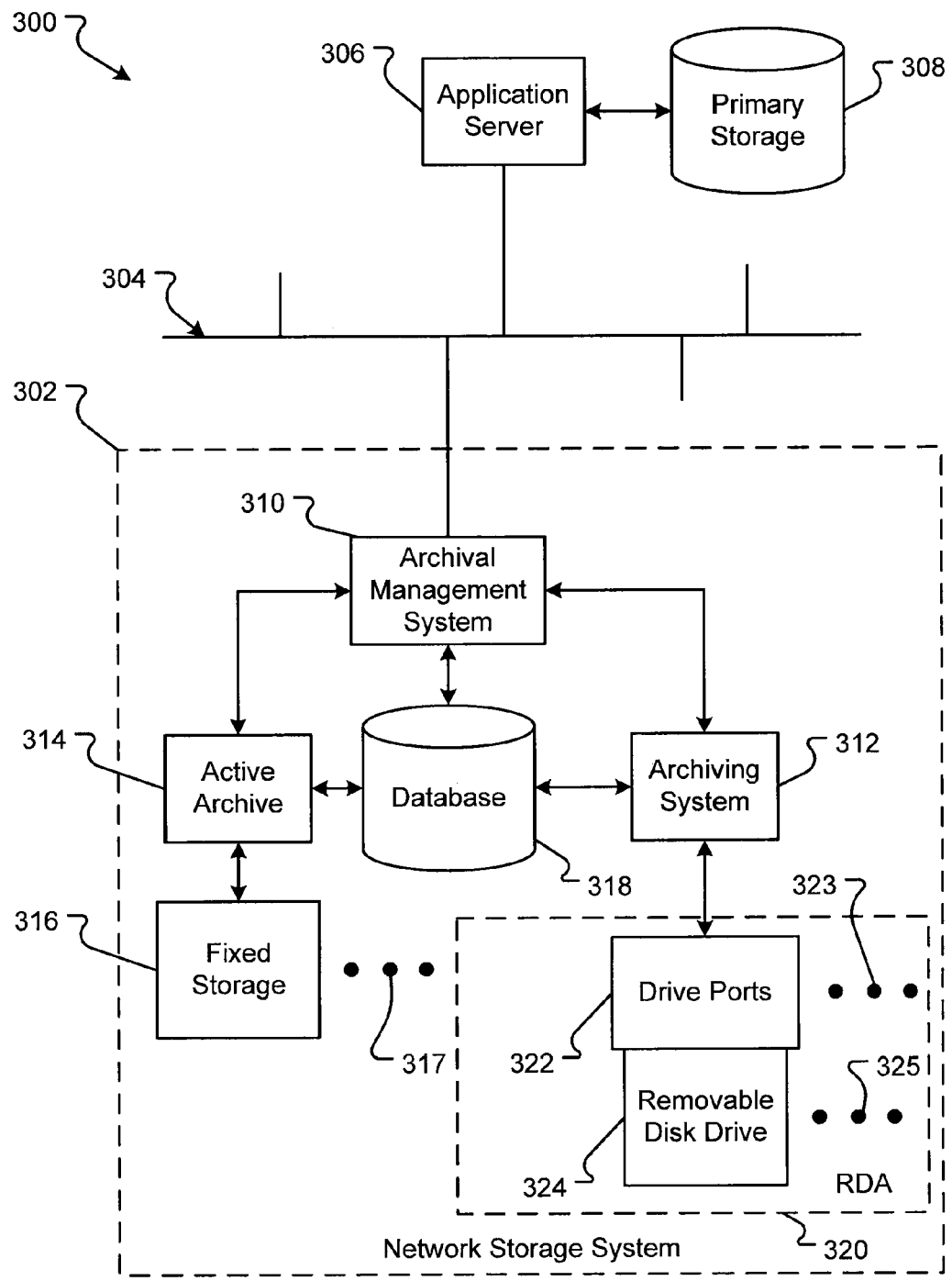
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312 in communication with one or more (as represented by ellipses 323) drive ports 322 that are in communication with one or more (as represented by ellipses 325) removable disk drives 324. The drive ports 322 and removable disk drives 324 are similar in function to those described in conjunction with FIG. 1. The archiving system 312 controls the function of the one or more drive ports 322 and writes the archived data to one or more predetermined removable disk drives 324 in the one or more drive ports 322.

In further embodiments, the network storage system 302 comprises an archival management system 310. The archival management system 310 receives data for archiving from one or more systems on the network 304. Further, the archival management system 310 determines to which system or removable disk drive 324 the data should be archived, in which format the data should be saved, and how to provide security for the network storage system 302.

In embodiments, the archival management system 310 provides a partitioned archive such that the network storage system 302 appears to be an independent file system to each separate application server 306, yet maintains the archive for multiple application servers 306. Thus, the archival management system 310 manages the network storage system 302 as multiple, independent file systems for one or more application servers 306. In embodiments, the archival management system 310 and the archiving system 312 are functional components of the archiving system appliance 210 (FIG. 2).

In embodiments, the archival management system 310 saves archival data to both the archiving system 312 and an active archive 314. The active archive 314, in embodiments, controls, reads from and writes to one or more (as represented by ellipses 317) fixed storage devices 316 that allow easier access to archived data. In embodiments, fixed storage 316 is similar in function to fixed storage 216 (FIG. 2). The active archive 314 performs similar functions to the archiving system 312 but for the fixed storage devices 316. In embodiments, the active archive 314 and the fixed storage devices 316 are components of the hardware fixed storage system 216 (FIG. 2). In alternative embodiments, the active archive 314 partitions the fixed storage 316 to mirror the associated application layer partitions in the RDA 320. The application layer partition(s) in the active archive 314 may have boundaries associated with memory addresses in the fixed storage 316.

The archival management system 310 may also provide an intelligent storage capability. Each type of data sent to the network storage system 302 may have different requirements and controls. For example, certain organizations, such as the SEC, Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310 can apply controls to different portions of the RDA 320 and the active archive 314 according to user-established data storage requirements. In one embodiment, the archival management system 310 creates application layer partitions in the archive that span one or more removable disk drives 324 and one or more portions of the fixed storage 316. All data to be stored in any one application layer partition can have the same requirements and controls. Thus, requirements for data storage are applied to different drive ports 222 (FIG. 2) in the modular drive bays 212 and 214 (FIG. 2) and to the removable disk drives 224 (FIG. 2) stored in those drive ports 222 (FIG. 2). Further, the requirements are likewise applied to different portions of the fixed storage 316 in the active archive 314. If a removable disk drive is replaced, the same storage requirements, in embodiments, are applied to the replacement removable disk drive 324 because of its location in the controlled drive port 322. As such, the archival management system 310 can individually maintain separate sets of data using different controls, even in different removable disk drives 324.

The network storage system 302 may also comprise a database 318 in communication with the archival management system 310. The database 318 is, in embodiments, a memory for storing information related to the data being archived. The database 318 may include HDDs, ROM, RAM or other memory either internal to the network storage system 302 and/or the archival management system 310 or separate as a discrete component addressable by the archival management system 310. The information stored in the database 318, in embodiments, includes one or more of, but is not limited to, data identification, application server identification, time of storage, removable disk drive identification, data format, encryption keys, application layer partition organization, etc.

The network 304, in embodiments, connects, couples, or otherwise allows communications between one or more other systems and the network storage system 302. For example, the application server 306 is connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310. The archival management system 310, in embodiments, sends the data to one or both of the active archive 314 and/or the archiving system 312 to be archived.

Figure 4:
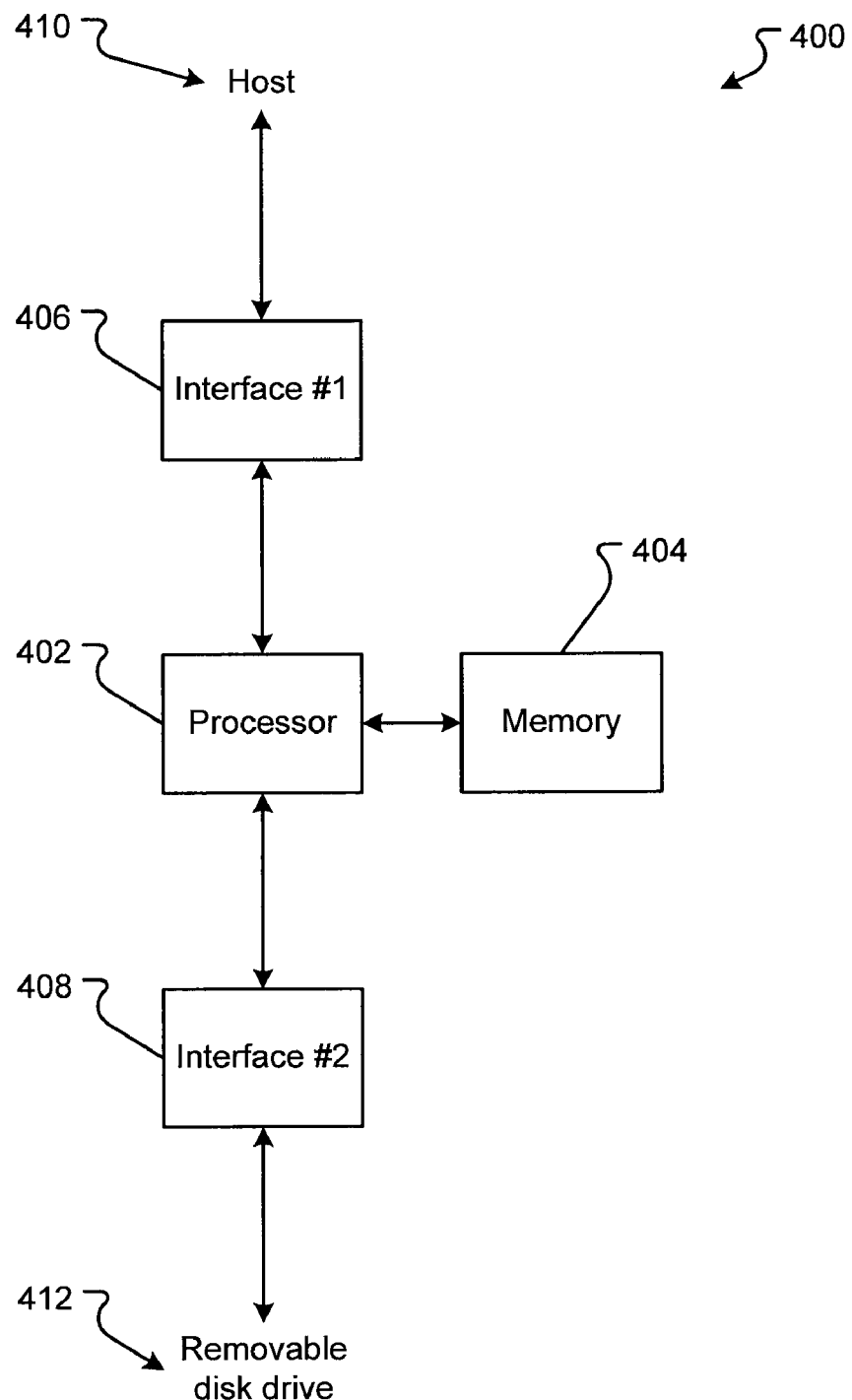
FIG. 4 is a hardware block diagram of an embodiment of a modular drive bay having two or more removable disk drives.

Embodiments of the hardware/firmware 400 of the modular drive bay 212 and 214 (FIG. 2) is shown in FIG. 4. In embodiments, the hardware/firmware 400 is the same or similar to hardware/firmware 116 explained in conjunction with FIG. 1. The hardware/firmware 400, in embodiments, comprises a first interface (interface #1) 406, a processor 402, a memory 404, and a second interface (interface #2) 408. In embodiments, the first interface 406 receives archival data from the host 410 for storage in a removable disk drive 412 and/or sends archived data from the removable disk drive 412 to the host 410. Removable disk drive 412 is, in embodiments, the same or similar to removable disk drive 102 described in conjunction with FIG. 1. The first interface 406 can be any type of interface operable to communicate with the host 410. In embodiments, the host 410 is the archiving system appliance 210 (FIG. 2) and/or archiving system 312 (FIG. 3). The first interface 406 can be a Firewire, USB, SATA, or other interface.

The processor 402 is operable to execute software or firmware stored in memory 404 for storing or retrieving archival data from the removable disk drive 412. The processor 402, in embodiments, is any processor known in the art for executing the functions described herein. For example, the processor 402 is an Intel Pentium, ASIC, FPGA, or other device. The processor 402 interfaces with the first interface 406 to receive archival data for storage and sends data to the host 410. The processor 402 further interfaces with the second interface 408 to send data to the removable disk drive 412 and to read data from the removable disk drive 412. The memory 404 may be any type of memory including, but not limited to, RAM, ROM, a disk drive, etc. The memory may store data or metadata and interfaces with the processor 402.

In embodiments, the second interface 408 retrieves archival data from the removable disk drive 412 to send to the host 410 and sends archival data to the removable disk drive 412 for storage. The second interface 408 can be any type of interface operable to communicate with the removable disk drive 412. The second interface 408 can be a Firewire, USB, SATA, or other interface.

Figure 5:
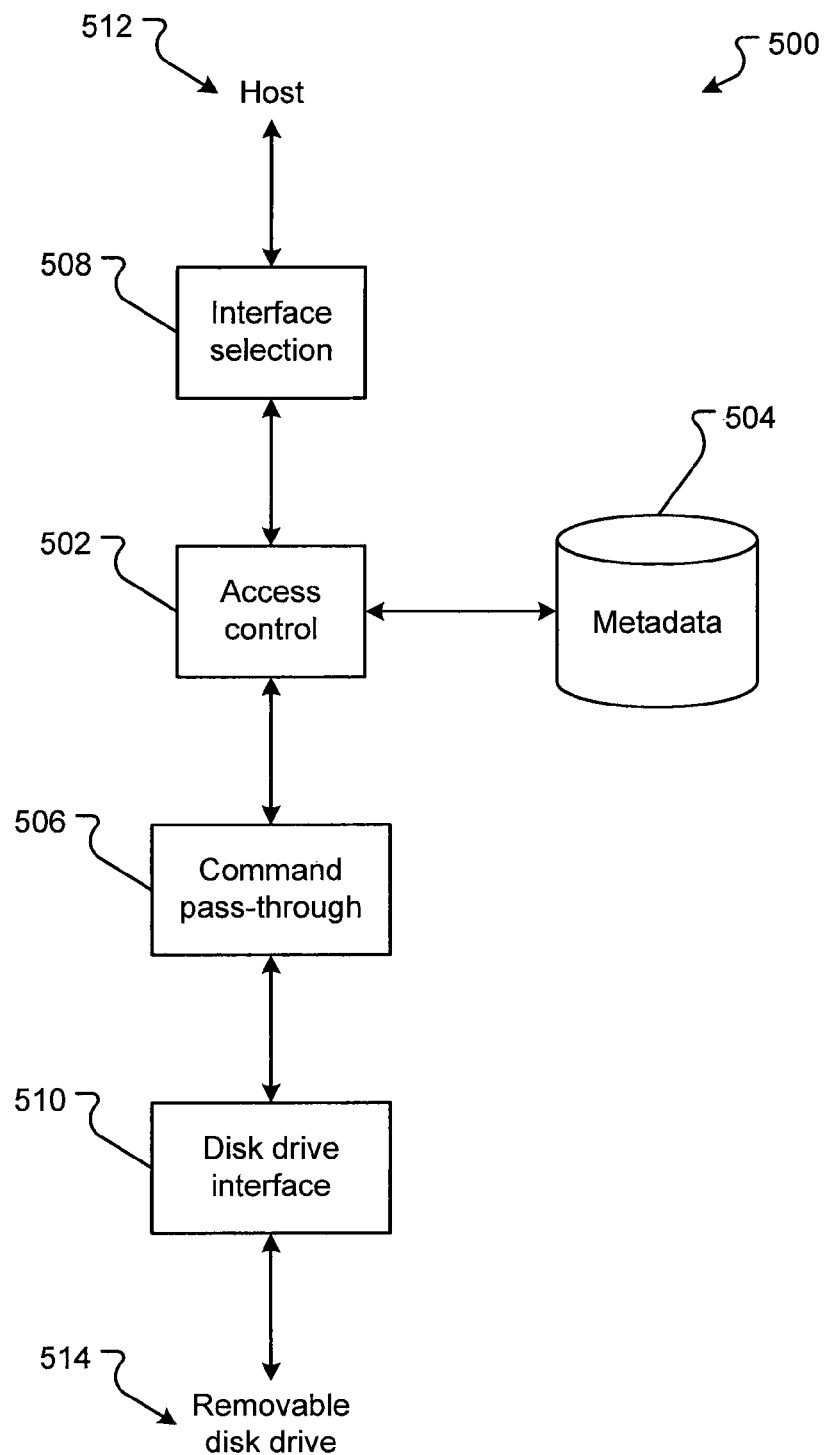
FIG. 5 is a functional block diagram of an embodiment of a modular drive bay.

A functional block diagram of an embodiment of the hardware/firmware 500 of the modular drive bay is shown in FIG. 5. In embodiments, the hardware/firmware 500 is the same or similar to hardware/firmware 116 explained in conjunction with FIG. 1 or hardware/firmware 400 described in conjunction with FIG. 4. In embodiments, the hardware/firmware 500 represents software executed in the hardware/firmware 400 (FIG. 4). The hardware/firmware 500, in embodiments, comprises an interface selection module 508, an access control module 502, a metadata datastore 504, a command pass-through module 506, and/or a disk drive interface 510.

In embodiments, the interface selection module 508 receives requests from the host 512 to store or retrieve archival data. The host 512 may send the requests with a predetermined address for the archival data. The interface selection module 508 can extract the address received from the host 512 to which to store or retrieve the archival data. This address is, in embodiments, provided to the access control module 502.

The access control module 502 is operable to read metadata from the metadata datastore 504. The access control module 502, in embodiments, builds the metadata datastore 504 by reading the metadata from one or more removable disk drives 514 and storing the metadata in a table or other data structure in the metadata datastore 504. In embodiments, the metadata datastore 504 provides a first available block address to store data in a removable disk drive 514. The first available block address can be used by the access control module 502 to determine where to begin to store or retrieve data. The access control module 502 can be executed within the processor 402 (FIG. 4).

In embodiments, the command pass-through module 506 sends the commands to the removable disk drive 514. For example, if the request from the host 512 is for a read of data, the command pass-through module 506 executes a read on the removable disk drive 514. The requested command sent from the host 512 may be in one format or comply with the protocol of one file system. The command pass-through module 506 may change the command to a command understandable by the removable disk drive 514. In further embodiments, the access control module 502 provides the command pass-through module 506 with the first available block address to ensure the command pass-through module 506 stores data at the correct address in the removable disk drive 514.

The disk drive interface 510, in embodiments, is a disk drive driver or other software that allows the command pass-through module 506 to interface with the removable disk drive 514. Thus, the disk drive interface 510 may convert commands for the removable disk drive 514.

Figure 6:
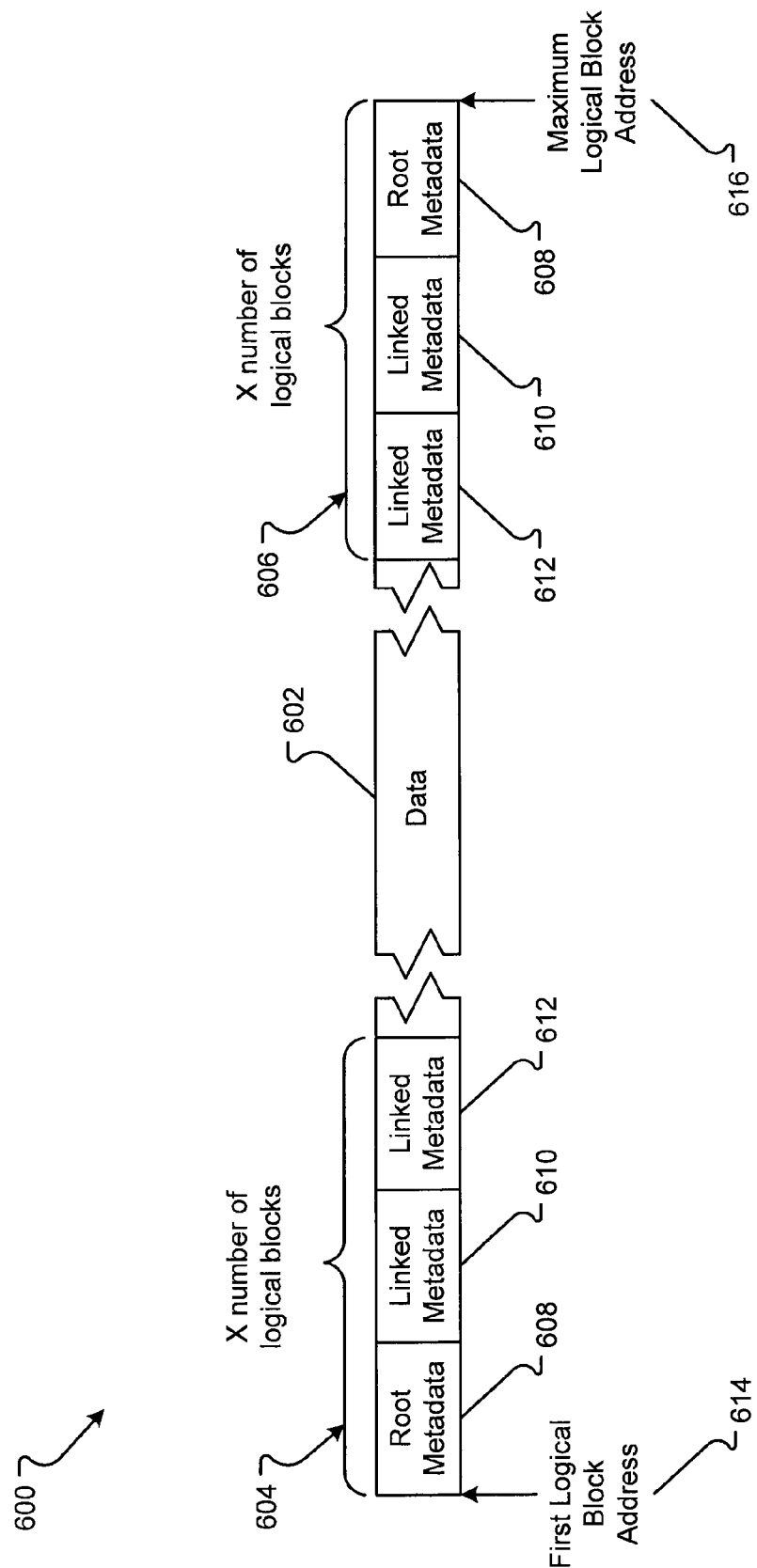
FIG. 6 is a block diagram of an embodiment of information elements stored in a removable disk drive.

An embodiment of an archive 600 stored in a removable disk drive, such as removable disk drive 514 (FIG. 5), having archival data and one or more portions of metadata is shown in FIG. 6. In embodiments, the archive 600 is a representation of the memory in the removable disk drive. In the example presented in. FIG. 6, there is archival data 602 that may have one or more portions that represent files or "information elements" stored in an archive 600. There may be more files than that shown in the exemplary archive 600. File data 602 can include the archived data sent from the application server 306 (FIG. 3). The file data 602 may not be overwritten or is immutable. Immutability means that the data, once written to a removable disk drive 514 (FIG. 5), is never replaced even if the data is updated. Rather, a new, revised copy is stored and the pointers to the data are realigned to point to the new copy of the data. In some embodiments, the file data 602 is protected by a write once read many (WORM) control that does not allow rewriting data. In other embodiments, file data 602 is just written to the next available logical block address on the removable drive without writing over previously saved data—no control necessarily forces this write procedure.

In embodiments, an archive structure 600 may comprise one or more portions of metadata. The metadata 604 and 606, in embodiments, includes the information or attributes about the data 602. For example, the metadata 604 and 606 may include one or more of the following, but is not limited to, the file size, file location, file save date and time, file creation date and time, file creator, etc. The metadata 604 and 606, in embodiments, is stored in two duplicate regions 604 and 606. A first portion of metadata is stored in a first area 604, while the second portion of metadata (which is a copy of the first portion of metadata) is stored in a second area 606. If the first set of metadata 604 is corrupted, the hardware/firmware 116 (FIG. 1) can fail-over to the second set of metadata 606. The metadata 604, in embodiments, includes a stored checksum. If a calculated checksum is not the same as the stored checksum, the metadata is known to be corrupted. In other embodiments, a checksum from the first portion of metadata 604 is compared to a checksum of the second portion of metadata 606 to determine if the metadata is corrupted.

In embodiments, the first area 604 and the second area 606 are a predetermined number of logical blocks that are reserved for the metadata. Thus, the first area 604 and the second area 606 may contain metadata in a first portion of the available logical blocks while no data is written to a second portion of the available logical blocks. As metadata is updated, the unused portion of the available logical blocks may be used.

In an embodiment, the metadata 604 includes a root metadata section 608 that has one or more portions of the metadata. The root metadata 608 may include metadata that remains permanent, for example, the disk drive identifier. The root metadata 608 also includes a link or pointer to a portion of linked metadata 610. Linked metadata 610, in embodiments, includes one or more items of data that may be updated. For example, if data within the data field 602 is updated, the linked metadata 610 may include the new address for the data. The new address in the linked metadata 610 would replace the original address in the root metadata 608. If another change is made to the data, one or more other linked metadata sections, such as linked metadata 612, can be created.

The metadata 604 may have the root metadata 608 stored beginning at a first logical block address 614. The linked metadata 610 and/or 612 is then stored in subsequent logical blocks. For metadata 606, the root metadata 608 is stored at a maximum logical block address 616. Each subsequent linked metadata 610 and 612 is then stored in preceding logical blocks. Thus, metadata 606, embodiments, appears as a mirror image of metadata 604.

Figure 7:
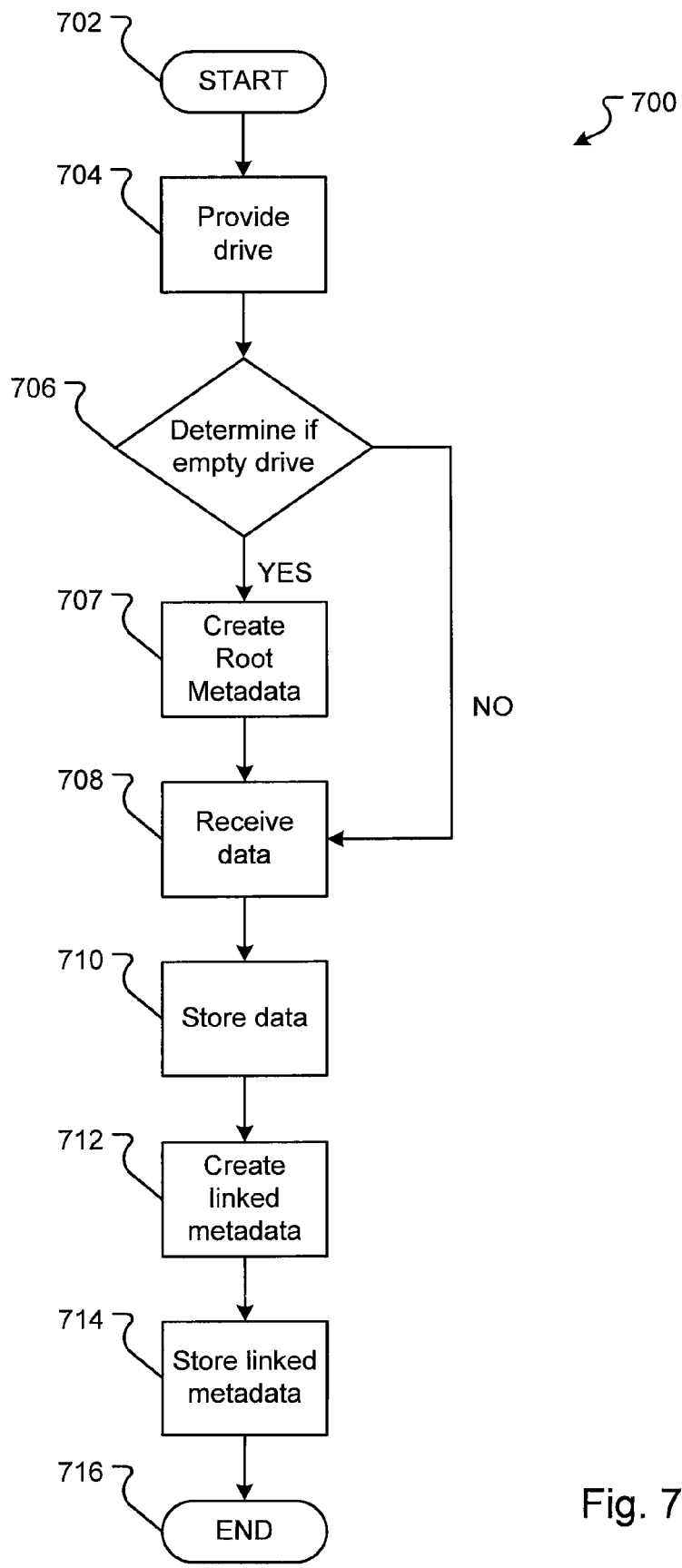
FIG. 7 is a flow diagram of an embodiment of a method for storing metadata on a removable disk drive.

An embodiment of a method 700 for storing data onto a removable disk drive in an archiving system is shown in FIG. 7. In embodiments, the method 700 generally begins with a START operation 702 and terminates with an END operation 716. The steps shown in the method 700 may be executed in a computer system as a set of computer-executable instructions. While a logical order is shown in FIG. 7, the steps shown or described can, in some circumstances, be executed in a different order than presented herein.

Provide operation 704 provides a drive. In embodiments, a removable disk drive 102 (FIG. 1) is inserted into a drive port 110 (FIG. 1) of a RDA 232. The removable disk drive 102 (FIG. 1) may be placed in the drive port 110 (FIG. 1) by a user or operator. The step of providing the disk drive 102 (FIG. 1) also includes all steps for initiating the disk drive 102 (FIG. 1) for use.

Determine operation 706 determines if the drive is empty. The archiving system 312 (FIG. 3) of the archiving system appliance 210 (FIG. 2) determines if the disk drive is new or has been used previously. In embodiments, the removable disk drive 102 (FIG. 1) is new if the removable disk drive 102 (FIG. 1) has no data stored upon it. The access control module 502 (FIG. 5) can determine if the removable disk drive 514 (FIG. 5) is empty. If the removable disk drive 514 (FIG. 5) is empty, the method 700 flows YES to create operation 707. If the removable disk drive 514 (FIG. 5) is not empty, the method 700 flows NO to receive operation 708.

Create operation 707 creates the root metadata. In embodiments, the access control module 502 (FIG. 5) creates the root metadata 608 (FIG. 6). The root metadata 608 may include at least one of, but is not limited to, cartridge authentication data, write protection controls, read protection controls, cartridge manufacturing data, location and size of user data partitions, format controls, cartridge information (serial number, manufacturer, etc.), usage information, or control information (error correction controls, compression, encryption, etc.). The access control module 502 (FIG. 5) may receive one or more of the metadata items from the archiving system 312 (FIG. 3). The access control module 502 (FIG. 5), in embodiments, stores the root metadata 608 (FIG. 6). In one embodiment, the access control module 502 (FIG. 5) stores duplicate copies of the root metadata 608 (FIG. 6) on the disk drive, a first copy is stored starting at a first logical block address 614 (FIG. 6) and a second copy is stored starting at a maximum logical block address 616 (FIG. 6).

Receive operation 708 receives data. In embodiments, the archiving system appliance 210 (FIG. 2) receives data from an application server 306 (FIG. 3). The data, in embodiments, is sent from the archival management system 310 (FIG. 3) to be stored in one or removable disk drive 324 (FIG. 3) by the archiving system 312 (FIG. 3). The archiving system 312 (FIG. 3) may then send the data to interface #1 406 (FIG. 4) for the processor 402 (FIG. 4) to store in the removable disk drive 412 (FIG. 4). The access control module 502 (FIG. 5) of the processor 402 (FIG. 4) can extract the metadata 604 (FIG. 6) from the removable disk drive 514 (FIG. 5). A location for the data is determined using the metadata 604 (FIG. 6). For example, the data is stored at the next available logical address block.

Store operation 710 stores the received data. The access control module 502 (FIG. 5), in embodiments, sends the data and a store command to the command pass-through module 506 (FIG. 5) that translates the command and sends the data to the removable disk drive 514 (FIG. 5). The disk drive interface 510 (FIG. 5) stores the data on the removable disk drive 514 (FIG. 5).

Create operation 712 creates linked metadata. Access control module 502 (FIG. 5), in embodiments, creates new linked metadata. The linked metadata 610 (FIG. 6) can include the data identification and the location of the data on the disk drive. In further embodiments, the linked metadata 610 (FIG. 6) also includes a storage location provided to the host 512 (FIG. 5) that is associated with the actual physical location of the data.

Store operation 714 stores the linked metadata. The access control module 502 (FIG. 5), in embodiments, sends the new linked metadata 610 (FIG. 6) and a store command to the command pass-through module 506 (FIG. 5) that translates the command and sends the linked metadata 610 (FIG. 6) to the removable disk drive 514 (FIG. 5). The disk drive interface 510 (FIG. 5) stores the linked metadata 610 (FIG. 6) on the removable disk drive 514 (FIG. 5) in the next available area in the reserved area 604 (FIG. 6) of the removable disk drive 514 (FIG. 5) for the metadata. In further embodiments, the disk drive interface 510 (FIG. 5) also stores a second copy of linked metadata 610 (FIG. 6) on the removable disk drive 514 (FIG. 5) in the next available area in the second reserved area 606 (FIG. 6) of the removable disk drive 514 (FIG. 5).

Figure 8:
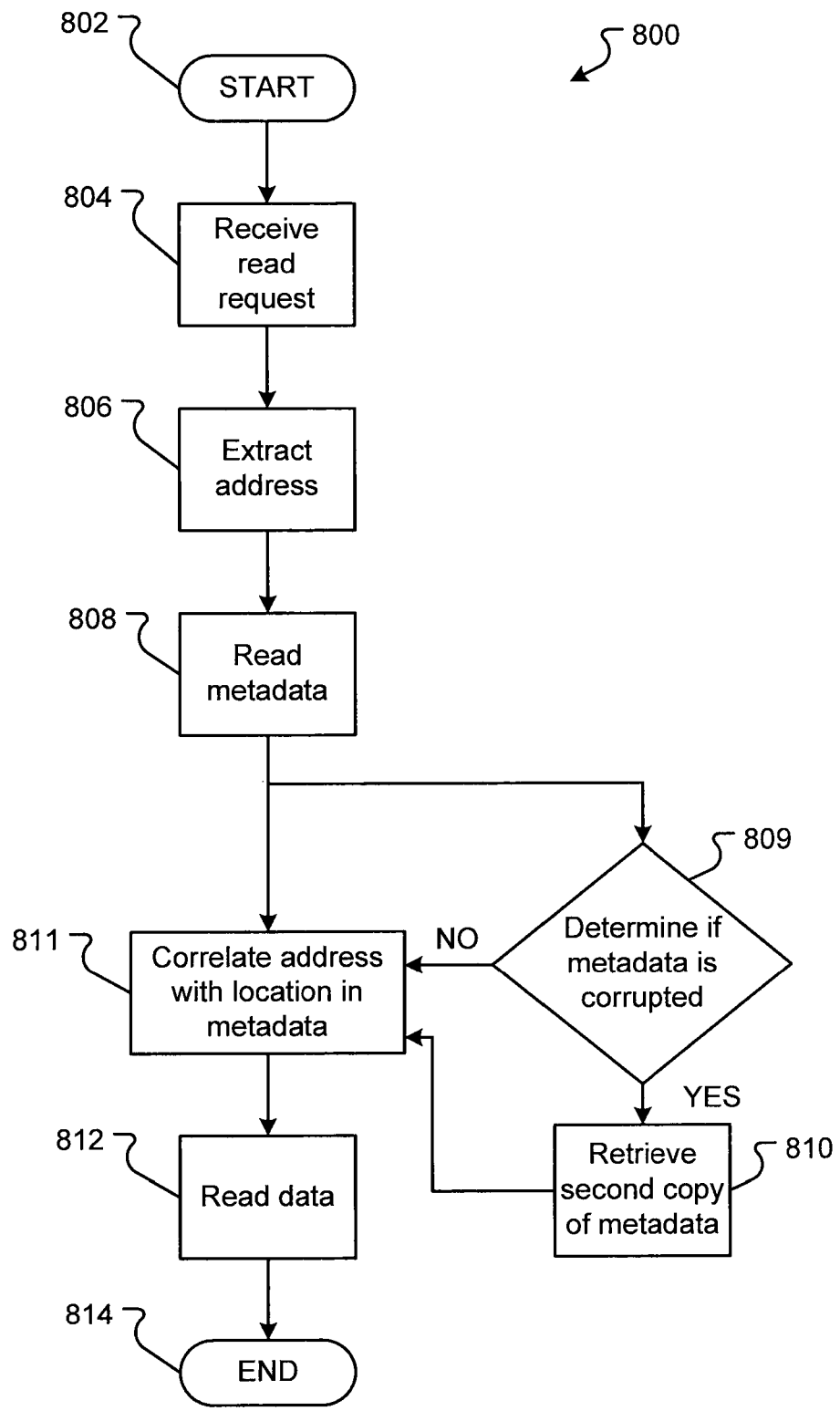
FIG. 8 is a flow diagram of an embodiment of retrieving metadata from a removable disk drive.

An embodiment of a method 800 for reading data from a removable disk drive in an archiving system is shown in FIG. 8. In embodiments, the method 800 generally begins with a START operation 802 and terminates with an END operation 814. The steps shown in the method 800 may be executed in a computer system as a set of computer-executable instructions. While a logical order is shown in FIG. 8, the steps shown or described can, in some circumstances, be executed in a different order than presented herein.

Receive operation 804 receives a request for data. In embodiments, the archiving system appliance 210 (FIG. 2) receives the request from an application server 306 (FIG. 3). The request, in embodiments, is sent from the archival management system 310 (FIG. 3) to the archiving system 312 (FIG. 3) to retrieve the data from one or more removable disk drives 324 (FIG. 3). The archiving system 312 (FIG. 3) may then send the request to interface #1 406 (FIG. 4) for the processor 402 (FIG. 4) to retrieve the requested data from the removable disk drive 412 (FIG. 4).

Extract operation 806 extracts an address from the request. In embodiments, the access control module 502 (FIG. 5) of the processor 402 (FIG. 4) can extract an address from the received request. For example, the request gives a location for the file in the retrieve request.

Read operation 808 reads metadata. The access control module 502 (FIG. 5) can read the metadata 604 (FIG. 6) from the removable disk drive 514 (FIG. 5). The metadata 604 (FIG. 6) may be temporarily stored in the metadata datastore 504 (FIG. 5).

Determine operation 809 determines if the metadata is corrupted. In embodiments, the access control module 502 (FIG. 5) determines if a checksum calculated for the metadata 604 is the same as a checksum stored in metadata 604. If the checksums compare, the metadata 604 is not corrupted and the method 800 flows NO to correlate operation.

Retrieve operation 810 retrieves the second copy of metadata. In embodiments, the access control module 502 (FIG. 5) retrieves and reads the second copy of metadata 606.

Correlate operation 811 correlates the extracted address with a physical location for the data in the removable disk drive 514 (FIG. 5). In embodiments, the access control module 502 (FIG. 5) determines the physical location for the requested data by associating the extracted address with a related address in the metadata 604 or 606 (FIG. 6). The metadata 604 or 606 (FIG. 6), in embodiments, has a table relating physical locations with addresses provided to the host 512 (FIG. 5).

Read operation 812 reads the data. The access control module 502 (FIG. 5), in embodiments, sends the read request to the command pass-through module 506 (FIG. 5) that translates the command and reads the data from the removable disk drive. The disk drive interface 510 (FIG. 5) retrieves the data on the removable disk drive 514 (FIG. 5).

In light of the above description, a number of advantages of the present disclosure are readily apparent. For example, the media, which may be an HDD or other random access and reusable media may be used in a manner that mimics sequential write access that prevents data from being overwritten. As such, the network storage system can maintain the media while still effectively protecting older copies of the data. Further, the network storage system can also ensure that data cannot be deleted. Still further, metadata may be maintained for the data on the media without allowing older metadata to be overwritten. Finally, metadata is protected from corruption by storing two copies of metadata on the removable disk drives.

Specific details are given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the disclosure.

What is claimed is:

1. A method, executable in a computer system, for retrieving data in an embedded memory of a removable disk drive, the method comprising:
   receiving a read request for one or more data blocks, the read request specifying a first address for retrieving the one or more data blocks;
   reading first metadata from the embedded memory, the first metadata being located in a first portion of the embedded memory, the first portion starting at a predetermined first logical start block address and continuing for a predetermined number of logical blocks from the first logical start block address;
   determining, from the first metadata and the specified first address, a second address indicating an actual location of a first data block for the one or more data blocks in the embedded memory, wherein the first metadata correlates the first address specified in the read request with the second address, the actual location being in a second portion of the embedded memory, the second portion being separate from and not intermingled with the first portion;
   converting the received read request to a read command based on the first metadata, the read command configured to cause the removable disk drive to read the one or more data blocks starting at the second address in the embedded memory; and
   reading the one or more data blocks by sending the converted read command to the removable disk drive.

2. The method as defined in claim 1, wherein the one or more data blocks are read sequentially.

3. The method as defined in claim 1, further comprising:
   extracting the specified first address for the one or more data blocks from the read request; and
   correlating the specified first address with the second address.

4. The method as defined in claim 1, further comprising:
   determining a last data block from the first metadata; and
   reading the one or more data blocks to the last data block.

5. The method as defined in claim 1, wherein determining the second address comprises:
   reading a root metadata to determine a pointer to a linked metadata;
   reading the second address from the linked metadata in an area indicated by the pointer.

6. The method as defined in claim 1, wherein determining the second address comprises:
   reading a root metadata to determine a first pointer to a linked metadata;
   reading the linked metadata to determine a second pointer, the second pointer indicating a new linked metadata; and
   reading the second address from the new linked metadata.

7. The method as defined in claim 1, wherein the first portion of the embedded memory stores only metadata and the second portion of the embedded memory stores only data blocks to be retrieved in response to receiving the read request.

8. The method as defined in claim 1, further comprising:
   determining if the first metadata is corrupted; and in response to determining that the first metadata is corrupted:
      reading second metadata from the embedded memory, the second metadata being located in a third portion of the embedded memory, the third portion starting at a predetermined second logical start block address and continuing for a predetermined number of logical blocks from the second logical start block address, the third portion being separate from and not intermingled with the first portion or the second portion, and
      determining the second address from the second metadata.

9. The method as defined in claim 1, further comprising:
   receiving, prior to receiving the read request, a write request to store the one or more data blocks, the write request specifying a first address to store the one or more data blocks;

determining, from the first metadata, the second address to store the one or more data blocks in the embedded memory, converting the write request to a write command based on the first metadata, the write command configured to cause the removable disk drive to store the one or more data blocks; and storing the one or more data blocks in the second portion of the embedded memory starting at the second address by sending the write command to the removable disk drive.

10. The method as defined in claim 9, wherein the one or more data blocks are stored sequentially.

11. The method as defined in claim 9, wherein the first portion of the embedded memory stores only metadata and the second portion of the embedded memory stores only data blocks that write requests have requested to be stored.

12. The method as defined in claim 9, further comprising: determining a last data block from the first metadata; and reading the one or more data blocks to the last data block.

13. The method as defined in claim 9, further comprising:
reading a root metadata to determine a pointer to a linked metadata;
reading the second address from the linked metadata in an area indicated by the pointer.

14. The method as defined in claim 9, further comprising:
reading a root metadata to determine a first pointer to a linked metadata;
reading the linked metadata to determine a second pointer, the second pointer indicating a new linked metadata; and
reading the second address from the new linked metadata.

15. The method as defined in claim 9, further comprising:
determining if the first metadata is corrupted; and in response to determining that the first metadata is corrupted:
reading second metadata from the embedded memory, the second metadata being located in a third portion of the embedded memory, the third portion starting at a predetermined second logical start block address and continuing for a predetermined number of logical blocks from the second logical start block address, the third portion being separate from and not intermingled with the first portion or the second portion, and
determining the second address from the second metadata.

16. A method, executable in a modular drive bay, for storing or retrieving data associated with an embedded memory of a removable disk drive coupled with the modular drive bay, the method comprising:
receiving a request from a host computer system at a processor of the modular drive bay, the request being a request to store or retrieve one or more data blocks, the request specifying a first address to store or retrieve the one or more data blocks;
reading first metadata from the embedded memory, the first metadata being located in a first portion of the embedded memory, the first portion starting at a predetermined first logical start block address and continuing for a number of logical blocks from the first logical start block address;
if the request is a write request:
determining, from the first metadata, a second address to store the one or more data blocks in the embedded memory of the removable disk drive, the second address being in a second portion of memory, the second portion of memory being separate from and not intermingled with the first portion,
converting the write request into a first write command based on the first metadata,
sending the first write command to the removable disk drive to cause the removable disk drive to store the one or more data blocks in the embedded memory starting at the second address; and
if the request is a read request:
determining, from the first metadata and the specified first address, a third address indicating an actual location of a first data block for the one or more data blocks in the embedded memory, wherein the first metadata correlates the first address specified in the read request with the third address, the actual location being in the second portion of the embedded memory,
converting the read request into a read command based on the first metadata, and
sending the read command to the removable disk drive to cause the removable disk drive to read the one or more data blocks starting at the third address in the embedded memory.

17. The method as defined in claim 16, wherein the first portion of the embedded memory stores only metadata and the second portion of the embedded memory stores only data blocks that write requests have requested to be stored.

18. The method as defined in claim 16, further comprising:
extracting the specified first address for the one or more data blocks from the read request; and
correlating the specified first address with the third address.

19. The method as defined in claim 16, wherein determining the second or third address comprises:
reading a root metadata to determine a pointer to a linked metadata;
determining the second or third address from the linked metadata and the specified first address.

20. The method as defined in claim 16, wherein determining the second or third address comprises:
reading a root metadata to determine a first pointer to a linked metadata;
reading the linked metadata to determine a second pointer, the second pointer indicating a new linked metadata; and
determining the second or third address from the new linked metadata and the specified first address.

21. The method as defined in claim 16, further comprising:
determining if the first metadata is corrupted; and in response to determining that the first metadata is corrupted:
reading third metadata from the embedded memory, the third metadata being located in a third portion of the embedded memory, the third portion starting at a predetermined second logical start block address and continuing for a predetermined number of logical blocks from the second logical start block address, the third portion being separate from and not intermingled with the first portion or the second portion, and
determining the second or third address from the third metadata and the specified first address.

* * * * *